United States Patent
Sawada et al.

(10) Patent No.: US 7,241,249 B2
(45) Date of Patent: Jul. 10, 2007

(54) DRIVING CONDITION CONTROL METHOD AND SYSTEM

(75) Inventors: Mamoru Sawada, Yokkaichi (JP); Toshiki Matsumoto, Kariya (JP); Tsutomu Tashiro, Nagoya (JP); Mamoru Mabuchi, Kariya (JP); Takehito Fujii, Anjo (JP); Motoaki Kataoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 120 days.

(21) Appl. No.: 10/869,506

(22) Filed: Jun. 17, 2004

(65) Prior Publication Data
US 2004/0259681 A1 Dec. 23, 2004

(30) Foreign Application Priority Data
Jun. 18, 2003 (JP) ............................ 2003-173853

(51) Int. Cl.
*B60W 10/04* (2006.01)
*B60W 10/18* (2006.01)

(52) U.S. Cl. .................. 477/186; 477/92; 477/183; 477/185; 477/187; 107/48; 107/69; 107/70; 107/72; 107/73; 107/75; 107/82; 303/139; 303/142

(58) Field of Classification Search ............... 477/92, 477/183, 184, 185, 186, 187; 701/48, 69, 701/70, 72, 73, 74, 75, 82, 91; 303/139, 303/142, 9.62
See application file for complete search history.

(56) References Cited

U.S. PATENT DOCUMENTS

| 4,718,735 | A | * | 1/1988 | Ogino ........................ 303/163 |
| 4,985,836 | A | * | 1/1991 | Hashiguchi et al. .......... 701/90 |
| 5,025,882 | A | * | 6/1991 | Ghoneim et al. ............ 180/197 |
| 5,315,519 | A | * | 5/1994 | Chin et al. ..................... 701/72 |
| 5,636,121 | A | * | 6/1997 | Tsuyama et al. .............. 701/70 |
| 6,002,979 | A | * | 12/1999 | Ishizu ........................ 701/86 |
| 2004/0041469 | A1 | * | 3/2004 | Ishikawa et al. ............ 303/139 |
| 2004/0158377 | A1 | * | 8/2004 | Matsumoto et al. .......... 701/48 |
| 2004/0262067 | A1 | * | 12/2004 | Sawada et al. ............. 180/282 |

FOREIGN PATENT DOCUMENTS

| JP | 9-242862 | 9/1997 |
| JP | 10-329585 | 12/1998 |
| JP | 2000-297664 | 10/2000 |

* cited by examiner

*Primary Examiner*—David D. Le
(74) *Attorney, Agent, or Firm*—Posz Law Group, PLC

(57) ABSTRACT

In a driving condition control system, a sensing unit is configured to sense a first physical quantity indicative of a rotation of the first rotatable axle assembly and a second physical quantity indicative of a rotation of the second rotatable axle assembly. A correcting unit is configured to correct the torque according to the sensed first and second physical quantities of the rotations of the first and second rotational axle assemblies. This allows the torque to be precisely obtained.

15 Claims, 5 Drawing Sheets

US 7,241,249 B2

DRIVING CONDITION CONTROL METHOD AND SYSTEM

BACKGROUND OF THE INVENTION

The present invention relates to a driving condition control method and system installed in a vehicle, which are capable of controlling the driving conditions of the vehicle.

Conventional techniques for causing a target torque to follow up a change of an accelerator pedal's operating state by a driver's operation are disclosed in Japanese Unexamined Patent Publication No. H09-242862 and in Japanese Unexamined Patent Publication No. H10-329585.

The technique disclosed in the former publication estimates the rising slope of a road surface according to accelerating resistance torque. The technique corrects the gear ratios of the automatic transmission (AT) of a vehicle, thereby keeping torque during the running of the vehicle on the rising slope of the road surface.

The technique disclosed in the later publication obtains a steady target torque of a driving system of a vehicle according to a driving condition of the vehicle, and determines a sequential waveform of a transient state of the target torque according to variation of the steady target torque within a predetermined control period.

The technique also obtains sequential data representing fluctuations of the target torque, and obtains the fluctuations of the target torque. The technique adds the obtained fluctuations of the target torque to the previous transient target torque to obtain a present transient target torque. The technique performs a transient control of the target torque while the steady target torque fluctuates.

On the other hand, another technique disclosed in Japanese Unexamined Patent Publication No. 2000-297664 prevents, when the operating state of an accelerator pedal of a vehicle by the driver is kept constant, a shock from occurring in the vehicle according to sudden change of the driving resistance of the vehicle. In particular, the technique estimates a driving resistance according to the vehicle speed and the vehicle acceleration to determine the target torque based on the estimated driving resistance.

These disclosed techniques, when the vehicle runs on a road surface that makes it difficult to obtain a desired torque, increase the command power with respect to the engine, thereby obtaining the desired torque.

Even when the vehicle runs on a road surface that causes the vehicle's torque to be lost, these techniques increase the command torque so that the loss of the torque may more increase.

SUMMARY OF THE INVENTION

The present invention is made on the background for providing a driving condition control method and system that are capable of correcting a loss of a torque to improve the torque efficiency of a vehicle.

According to one aspect of the present invention, there is provided a driving condition control system installed in a vehicle. The vehicle has a source of power for generating power, a first rotatable axle assembly to which a front wheel is attached, and a second rotatable axle assembly to which a rear wheel is attached. The power is transferred to the second rotatable axle assembly so that the second rotatable axle assembly is rotated to generate torque. The driving condition control system comprises a sensing unit configured to sense a first physical quantity indicative of a rotation of the first rotatable axle assembly and a second physical quantity indicative of a rotation of the second rotatable axle assembly. The driving condition control system also comprises a correcting unit configured to correct the torque according to the sensed first and second physical quantities of the rotations of the first and second rotational axle assemblies.

According to another aspect of the present invention, there is provided a program product having a computer-readable medium of an electronic control unit. The computer-readable medium stores therein a program. The electronic control unit is installed in a vehicle. The vehicle has a source of power for generating power, a first rotatable axle assembly to which a front wheel is attached, and a second rotatable axle assembly to which a rear wheel is attached. The power is transferred to the second rotatable axle assembly so that the second rotatable axle assembly is rotated to generate torque. The vehicle also has a sensing unit that senses a first physical quantity indicative of a rotation of the first rotatable axle assembly and a second physical quantity indicative of a rotation of the second rotatable axle assembly. The program causes an electronic control unit to receive the first physical quantity indicative of the rotation of the first rotatable axle assembly and the second physical quantity indicative of the rotation of the second rotatable axle assembly from the sensing unit. The program causes an electronic control unit to correct the torque according to the sensed first and second physical quantities of the rotations of the first and second rotational axle assemblies.

According to a further aspect of the present invention, there is provided a method of controlling a driving condition of a vehicle. The vehicle has a source of power for generating power, a first rotatable axle assembly to which a front wheel is attached, and a second rotatable axle assembly to which a rear wheel is attached. The power is transferred to the second rotatable axle assembly so that the second rotatable axle assembly is rotated to generate torque. The method comprises sensing a first physical quantity indicative of a rotation of the first rotatable axle assembly and a second physical quantity indicative of a rotation of the second rotatable axle assembly. The method also comprises correcting the torque according to the sensed first and second physical quantities of the rotations of the first and second rotational axle assemblies.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the invention will be described hereinafter with reference to the accompanying drawings.

First Embodiment

Figure 1:
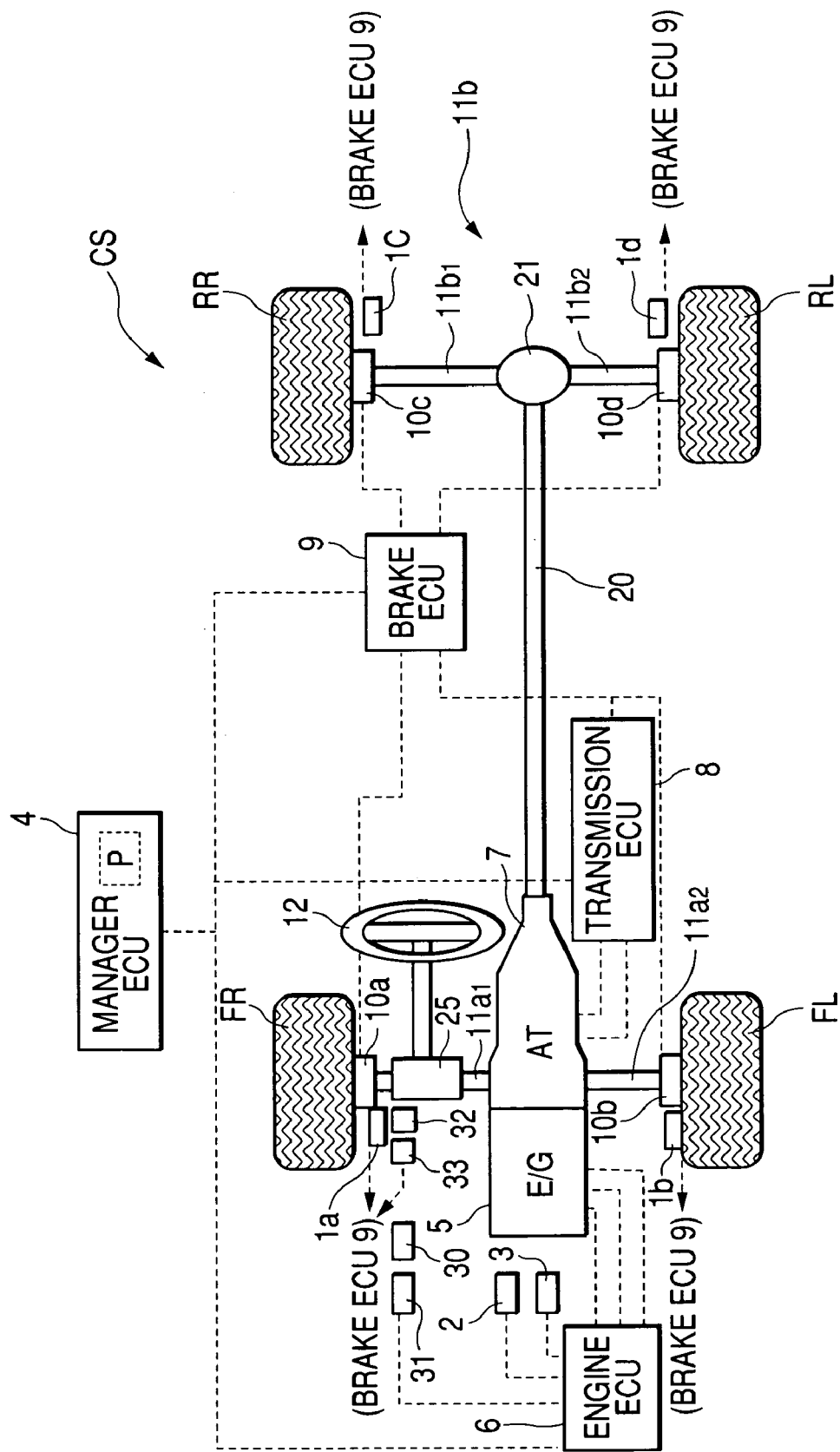
FIG. 1 is a schematic structural view of a driving condition control system according to a first embodiment of the present invention.

FIG. 1 is a schematic structural view of a driving condition control system according to a first embodiment of the present invention. The driving condition control system CS is installed in a vehicle, such as four-wheel automobile, V that is a type of front-engine-rear-drive vehicles.

That is, the vehicle V is provided with an engine 5, a drive shaft 20, and an automatic transmission (AT) 7 having a gear box and mechanically connected between the engine 5 and one end of the drive shaft 20. The AT 7 changes the gear ratios of the gear box independently of the driver to convert the engine's power output to torque based on the gear ratios, thereby transferring the torque to the drive shaft 20.

The vehicle V is also provided with a front axle assembly (rolling axle assembly) 11a and a rear axle assembly (drive axle assembly) 11b. The front axle assembly 11a has a supporting member, a right-front axle 11a1, and a left-front axle 11a2 that are individually rotatably supported therewith. Front left and right wheels FL and FR are fixed to the right-front axle 11a1 and the left-front axle 11a2, respectively.

The rear axle assembly 11b has a center differential 21 with right-rear axle assembly 11b1 and left-rear axle 11b2 (half shafts) coupling right and left rear wheels RR and RL to the differential 21, respectively.

The differential 21 is mechanically coupled to the other end of the drive shaft 20.

The left-rear axle 11b2 is supported at its one end with the differential 21 to be rotatable around its axial direction orthogonal to the axial direction of the drive shaft 20. Similarly, the right-rear axle 11 is supported at its one end with the differential 21 to be rotatable around its axial direction orthogonal to the drive shaft's axial direction.

The differential 21 converts the rotation of the drive shaft DF to each rotation of each of the right and left rear wheels (right and left rear axles 11b1 and 11b2), and allows the right and left rear wheels RR and RL to revolve at different speeds during turns.

To the front and rear wheels FR, FL, RR, and RL, for example, drum brakes (not shown) are attached, respectively. Each of the drum brakes has a drum attached to each of the wheels and rotatable together therewith. Each of the drum brakes has brake shoes fit inside thereof.

In addition, the vehicle V has a steering wheel 12 that the driver can operate and a steering mechanism 25 mechanically connected to the steering wheel 12 and the front right and left wheels FR and FF. The driver's steering operation of the steering wheel 12 allows the front right and left wheels FR and FL to steer, thereby turning (steering) the vehicle V.

On the other hand, the driving condition control system CS is equipped with a plurality of sensors 1a-1d, 2, and 3, a manager ECU (Electronic Control Unit) 4, an engine ECU 6, a transmission ECU 8, the brake ECU 9, and braking force generating units 10a-10d.

The sensors include wheel speed sensors 1a-1d, an engine revolution sensor 2, and an intake air mass sensor 3.

The wheel speed sensors 1a, 1b, 1c, and 1d are. disposed close to the wheels FR, FL, RR, and RL, respectively. The wheel speed sensors 1a-1d are electrically connected to, for example, each of the ECUs 4, 6, 8, and 9.

The wheel speed sensors 1a-1d sense the wheel speeds of the wheels FR-RL to output the sensed wheel speeds as wheel speed signals of the wheels FR-FL to the brake ECU 9.

Each of the wheel speed signals can be used for calculating the wheel speed of each of the wheels FR-RL, the speed Vso of the vehicle body, the slip ratio indicative of how much slipping is occurring between the wheels FR-RL and the road surface, and the like.

In addition, in this first embodiment, each of the wheel speed signals can be used for calculating rotational state of each of the front and rear axle assemblies 11a and 11b to which the wheels are attached. That is, the wheel speed signals allow physical quantity indicative of the rotation of each of the front and rear axle assemblies 11a and 11b. In this first embodiment, as an example of physical quantity, the rotational speeds Vd and Vr of the driving axle assembly (rear axle assembly) 11b and the front axle assembly 11a are used. Incidentally, as another example of physical quantity, the revolutions of the rear axle assembly 11b and the front axle assembly 11a may be used.

The engine revolution sensor 2 is electrically connected to the engine ECU 6 and operative to output an engine revolution signal indicative of the revolution of the engine 5 that is served as power source for generating power (torque), thereby outputting the engine revolution signal to the engine ECU 6. The intake air mass sensor 3 senses intake air mass of the engine 5 to output the sensed intake air mass as intake air mass signal to the engine ECU 6.

In this first embodiment, the driving condition control system CS includes the engine revolution sensor 2 and the intake air mass sensor 3, but they can be omitted from the structure of the system CS. In this modification, the engine revolution and the intake air mass can be estimated according to an engine control signal outputted from the engine ECU 6.

The manager ECU 4 receives the engine control signal outputted from the engine ECU 6 and a transmission control signal outputted from the transmission ECU 8. The manager ECU 4 also receives a brake control signal outputted from the brake ECU 9 and the wheel speed signals outputted from the wheel speed sensors 1a-1d. The manager ECU 4 performs various operations including any one of an engine control operation, a brake control operation, and a transmission control operation, for controlling the driving conditions of the vehicle V according to the received signals.

The manager ECU 4 outputs at least one control signal based on the operation result. At least one of the engine ECU 6, the brake ECU 9, and the transmission ECU 8 receives the at least one control signal to perform at least one of the control operations corresponding to the at least one control signal.

The engine ECU 6, which corresponds to, for example, a power control unit, is operative to control the power of the engine 5 according to the position of an accelerator pedal 30 that is operated by the drier and sensed by an accelerator pedal sensor 31. The accelerator pedal 30 determines to control the flow of fuel into the engine 5.

That is, the engine ECU 6 determines the engine control signal including a command that makes the engine 5 output predetermined engine power (torque Td) according to the position of the accelerator pedal 30, and the engine ECU 6 outputs the engine control signal to the engine 5.

In addition, the engine ECU 6 adjusts the predetermined power according to the received engine revolution signal, the received intake air mass signal, the control signal outputted from the manager ECU 4.

For example, the engine ECU 6 normally determines the engine power that corresponds to the position of the accelerator pedal 30 to generate the engine control signal indicative of the determined engine power.

When the control signal indicative of requiring the engine ECU 6 to reduce the amount of engine power is transmitted from the manager ECU 4 to the engine ECU 6, the engine ECU 6 calculates power control parameters, such as the torque of the engine and the engine revolution, that are required to reduce the amount of engine power. The engine ECU 6 outputs the engine control signal indicative of the calculated power control parameters to the engine 5. In the engine 5, the torque of the engine 5 and the engine revolution are adjusted according to the engine control signal, thereby reducing the amount of engine power.

The transmission ECU 8 is operative to change the gear ratios of the AT 7 according to the position of a shift lever (not shown). That is, the transmission ECU 8 determines the transmission control signal indicative the predetermined gear ratios that correspond to the position of the shift lever, thereby outputting the transmission control signal to the AT 7. The transmission control signal allows the AT 7 to change its current gear ratios to the predetermined gear ratios that correspond to the position of the shift lever.

In addition, the transmission ECU 8 adjusts the predetermined gear ratios according to the received wheel speed signals outputted from the sensors 1a-1d, the control signal indicative of the torque calculated by the engine ECU 6, and so on. The transmission ECU 8 outputs the transmission control signal that allows the AT 7 to adjust the gear ratios to correspond to the engine torque and the wheel speeds. In the AT 7, the gear ratios are adjusted according to the transmission control signal.

On the other hand, each of the brake force generating units 10a-10d is electrically connected to each of the brakes and the brake ECU (electronic control unit) 9 described hereinafter. Each of the brake force generating units 10a-10d is provided with, for example, a wheel cylinder (W/C) that is mechanically connected to each of the brake shoes. Each of the wheel cylinders is operative to convert hydraulic pressure to mechanical force as the brake force, thereby applying it on each of the brake shoes.

That is, the mechanical force applied on each of the brake shoes causes each brake shoe to press against the inside of each of the brake drums, thereby stopping the rotation of each wheel by friction between each of the brake drums and each of the brake shoes.

The brake ECU 9, which corresponds to, for example, a brake control unit, is operative to control the brakes according to the position of a brake pedal 32 operated by the drier and sensed by a brake pedal sensor 33.

That is, the brake ECU 9 determines the brake control signal that allows each of the brake force generating units 10a-10d to generate predetermined brake force according to the position of the brake pedal 32, and the brake ECU 9 outputs the brake control signal to each of the brake force generating units 10a-10d.

In addition, the brake ECU 9 adjusts the predetermined brake force according to the received wheel speed signals outputted from the sensors 1a-1d and the control signal outputted from the manager ECU 4.

For example, the brake ECU 9 calculates the wheel speeds Vw and the vehicle body speed Vso of the vehicle body according to the wheel speed signals so as to calculate the slip ratio based on the calculated wheel speeds Vw and the vehicle body speed Vso. Subsequently, the brake ECU 9 detects a locking tendency in the wheels FR-RL according to the calculated slip ratio, thereby outputting to each of the brake force generating units 10a-10d the brake control signal for ABS (Anti Lock Braking System) control. The brake control signal can prevent an event representing a rapid reduction in speed where one or more wheels begin to lock-up from occurring.

Each of the brake force generating units 10a-10d adjusts the generated brake force according to the brake control signal.

Next, processes of controlling the driving conditions of the vehicle V, which are performed by the driving condition control system CS, will be described hereinafter.

In the driving condition control apparatus CS according to the first embodiment, the engine power generated by the engine 5 is transferred through the automatic transmission 7 and the rear axle assembly 11b to the rear wheels (driving wheels) RR and RL so that the rear wheels RR and RL are rotated to generate torque.

The generated torque is transferred to the front wheels (rolling wheels) FR and FL to rotate them. If the torque on the rear wheels RR and RL is transferred to the rolling wheels FR and FL without losing at least a little of the torque, the driving wheels RR and RL and the rolling wheels FR and FL would be equally rotated.

If, however, the driving wheels RR and RL are differently rotated from the rolling wheels FR and FL, some factors cause at least a little of the torque to be lost.

The driving condition control system CS according to the first embodiment obtains the relationship between the rotational conditions of each driving wheel and each rolling wheel to correct the loss of the torque according to the obtained relationship, thereby improving the transmission efficiency between each driving wheel and each rolling wheel.

Specifically, the rotational speed of the front axle assembly, that is the rolling axle assembly 11a, to which the front wheels FR and FL are attached, is defined as rolling axle speed Vr. In addition, the rotational speed of the rear axle assembly, that is the drive axle assembly 11b, to which the rear wheels RR and RL are attached, is defined as drive axle speed Vd.

The ratio of the rolling axle speed Vr and the drive axle speed Vd, which is referred to as "Vr/Vd", represents the degree of the loss of the torque.

The driving condition control system CS uses the ratio "Vr/Vd" as a correction coefficient to correct the torque according to the correction coefficient "Vr/Vd".

That is, the driving condition control system CS according to the first embodiment performs the following processes on the basis of the above concept.

Figure 2:
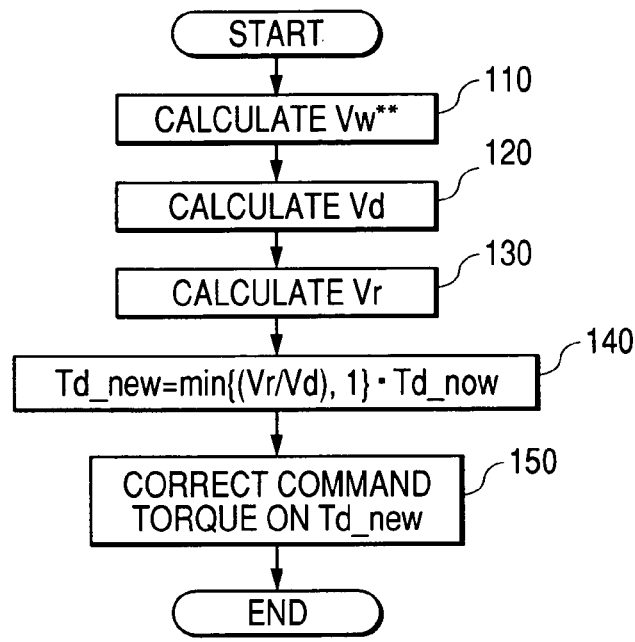
FIG. 2 is a flowchart schematically illustrating processes that a manager ECU (electronic control unit) shown in FIG. 1 executes according to the first embodiment.

FIG. 2 shows a flowchart of processes that the manager ECU 4 executes, explaining the processes of the driving condition control system CS in detail based on the flowchart. Incidentally, the manager ECU 4 performs these processes based on a program P previously installed in a computer-readable medium, such as ROM (Read Only Memory), RAM (Random Access Memory), a semiconductor memory and so on, which is installed in the manager ECU 4.

In addition, the manager ECU 4 periodically performs the following processes.

In step 110, the manager ECU 4 calculates the wheel speed Vw of each of the wheels FR, FL, RR, and RL according to the wheel speed signals outputted from the wheel speed sensors 1a-1d. This reference character "Vw" collectively represents each of the wheel speeds of each of the wheels FR, FL, RR, and RL. Specifically, when representing the wheel speed of the front wheel FR, an identifier of the front wheel FR, such as "FR", is assigned to the character "**". Consequently, this process obtains each of the wheel speeds VwFR, VwFL, VwRR, and VwRL of each of the wheels FR, FL, RR, and RL.

In step 120, the manager ECU 4 calculates, as the drive axle speed Vd representing physical quantity of the rotation of the drive axle assembly (rear axle assembly) 11b, an average value of the wheel speeds VwRR and VwRL of the rear wheels RR and RL.

In step 130, the manager ECU 4 calculates, as the rolling axle speed Vr representing physical quantity of the rotation of the rolling axle assembly (front axle assembly) 11a, an average value of the wheel speeds VwFR and VwFL of the front wheels FR and FL.

In step 140, the manager ECU 4 performs the torque Td of the engine 5.

Specifically, when the manager ECU 4 previously obtains the value (previous value) of the torque Td as "Td_now" during the previous period, the manager ECU 4 calculates a new value "Td_new" of the torque Td according to the previous value "Td_now", the drive axle speed Vd and the rolling speed Vr according to the following equation [1]

$$Td\_new = \min\{(Vr/Vd), 1\} \cdot Td\_now \quad [1]$$

Where the function "min {(Vr/Vd), 1}" outputs the less of the "Vr/Vd" and 1.

That is, the manager ECU 4 multiplies the previous value Td_now of the torque Td by the less of the of the previous value "Vr/Vd" and 1, thereby obtaining the new value "Td_new". Then, the torque Td of the engine 5 generated by the engine 5 according to the engine control signal is outputted from the engine ECU 6.

In step 150, the manager ECU 4 calculates the command torque according to the calculated new value "Td_new" and output to the engine ECU 6 the control signal requesting the engine ECU 6 to output the engine control signal including the command torque. The engine ECU 6 adjusts the engine torque to meet the command torque independently of the position of the accelerator pedal 30, thereby controlling the torque transferred to the drive axle assembly 11b (the drive wheels RR and RL).

These processes allow the torque for rotating the rear wheels RR and RL to be corrected, and the correction of the torque permits the loss of the torque transferred to the front wheels FR and FL to be corrected, thereby improving engine-power transmission efficiency between each drive wheel RR, RL and each rolling wheel FR, FL.

When the vehicle V becomes unstable (the driving condition of the vehicle V is unstable), therefore, the driving condition control system CS according to the first embodiment corrects the loss of the torque due to the unstable driving condition. Incidentally, the "unstable driving condition" represents vehicle's driving conditions that are different from the driver's intended driving conditions. For example, when turning at a corner, the behaviors of the vehicle V shift from a driver's intended behavior, as shown in FIG. 3.

Figure 3:
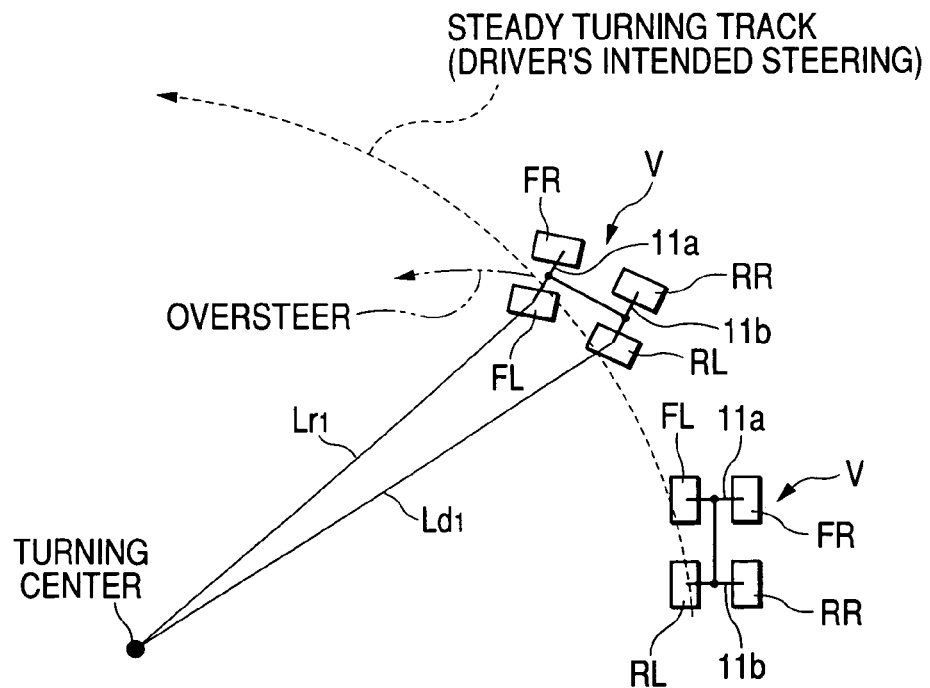
FIG. 3 is a view illustrating a condition that, when turning at a corner, the front portion of a vehicle shown in FIG. 1 turns or likely turns towards inside more than a steady turning track corresponding to a driver's intended steering by a steering wheel shown in FIG. 1 according to the first embodiment.

FIG. 3 shows a condition that, when turning at the corner, the front portion of the vehicle V turns or likely turns towards inside more than the steady turning condition corresponding to the driver's intended (inputted) steering by the steering wheel 12.

In FIG. 3, the approximately circular broken line around a predetermined turning center represents the turning track based of the steady turning condition.

This driving condition shown in FIG. 3 is referred to as "unstable condition of inside turning", such as oversteer.

In a case where the vehicle V drives in the unstable condition of inside turning (see FIG. 3), the drive axle speed Vd is faster than the rolling axle speed Vr, which is represented as Vr<Vd. This relationship causes the turning radius Lr1 of the front right wheel FR around the turning center to be shorter than the turning radius Ld1 of the rear right wheel RR therearound, which is represented as Lr1<Ld1. This relationship is effected between the front left wheel FL and rear left wheel RL.

The unstable condition of the inside turning is caused by instability of energy transfer with respect to the front and rear wheels FR, FL, RR, and RL.

The unstable condition of the inside turning during, for example, acceleration occurs because excess acceleration energy to drive the rear wheels RR and RL is given to the drive axle, as compared with the steady turning condition.

In particular, excessive rotational energy given to the drive axle assembly 11b transferred from the engine 5 with respect to the traction limit of the road surface due to the friction coefficient μ causes the tire longitudinal forces acting on each of the rear wheels RR and RL to excessively increase. This excessive increase of the longitudinal forces acting on the rear wheels RR and RL causes the vehicle V to become the unstable condition of inside turning, such as acceleration slip condition or power-oversteer condition.

While the vehicle V is being accelerated, if the vehicle V becomes or tends to become the unstable condition of inside turning, the torque transferred to the drive axle assembly 11b is corrected according to the correction coefficient "Vr/Vd".

Figure 4:
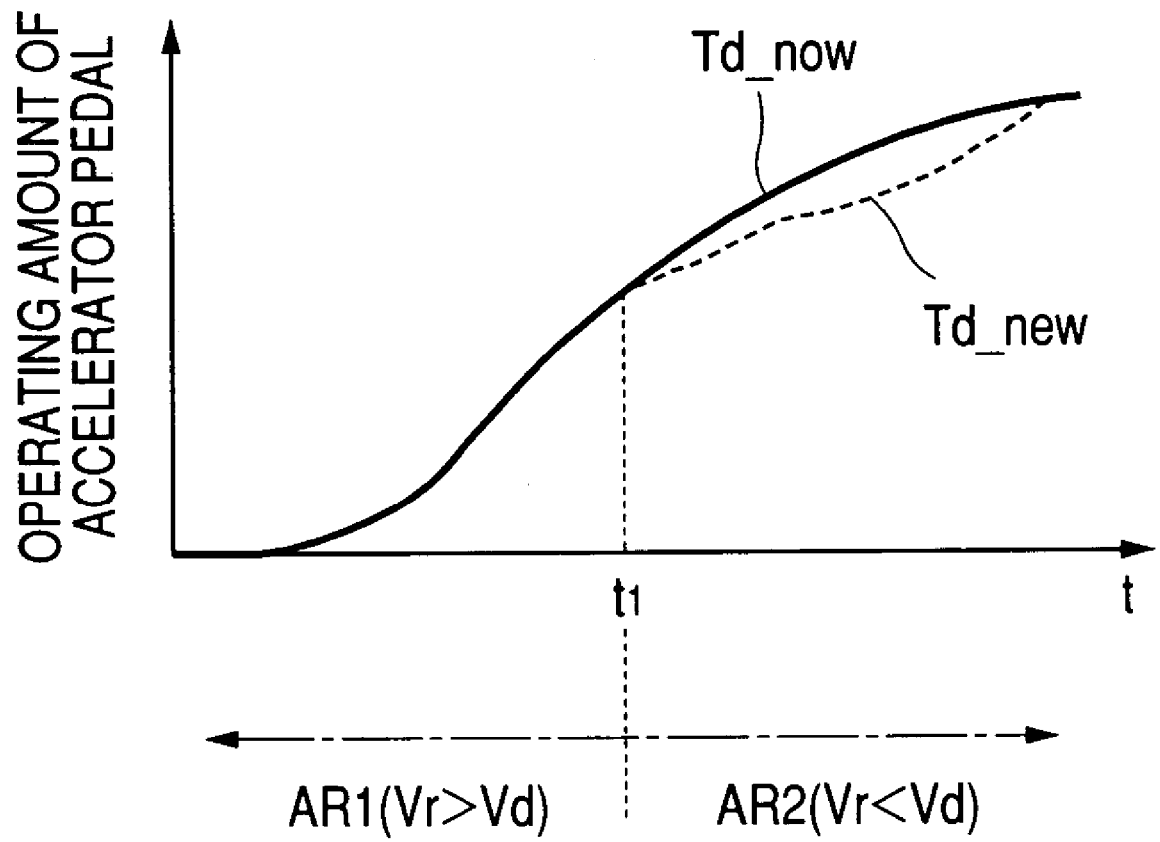
FIG. 4 is a graph illustrating a temporal characteristic of an operation amount of an accelerator pedal shown in FIG. 1 by a driver according to the first embodiment.

Specifically, it is assumed that a temporal characteristic of the operation amount of the accelerator pedal 30 by the driver shown in FIG. 4.

When the manager ECU 4 determines that the correction coefficient "Vr/Vd" is more than 1 at arbitrary time t1, in other words, the rolling axle speed Vr is faster than the drive axle speed Vd, the manager ECU 4 outputs, as the new value Td_new of the torque Td, the previous value Td_new as it is.

As a result, the correction of the torque Td is not performed so that the torque Td is increased according to the operation amount of the accelerator pedal 30 by the driver (see area AR1 in FIG. 4).

When determining that the correction coefficient "Vr/Vd" is less than 1, in other words, the rolling axle speed Vr is later than the drive axle speed Vd, if the manager ECU 4 does not perform the correcting processes in steps 130-150, the command torque "Td_now" is transferred to the drive axle assembly 11b. This transferred command torque "Td_now" is excessively large and corresponds to the operating amount of the accelerator pedal 30. This excessive torque may cause the vehicle V to become the unstable condition of inside turning, as described above.

In contrast, in the first embodiment of the present invention, when determining that the rolling axle speed Vr is later than the drive axle speed Vd, the manager ECU 4 controls to decrease the command torque Td of the engine 5 corresponding to the driver's intention (operating amount of the accelerator pedal 30). Specifically, the manager ECU 4 multiplies the command torque Td by the correction coefficient "Tr/Td" that is less than 1 to decrease the command torque Td of the engine 5.

This results in decreasing the command torque transferred to the drive axle assembly 11b so that it is possible to smoothly transfer the torque from the drive wheels RR and RL to the rolling wheels FR and FL, which allows the unstable condition of the vehicle V to be overcome.

As described above, in the driving condition control system CS according to the first embodiment, correcting the torque according to the correction coefficient allows the transfer loss between the drive wheels and the rolling wheels. This results in improving the engine-power transmission efficiency.

In addition, in the first embodiment, the loss of the torque is corrected according to the rotational speeds of the rolling axle assembly 11a and the drive axle assembly 11b, which represent the rotational conditions thereof.

Specifically, if the drive axle speed Vd is faster than the rolling axle speed Vr, that is, the correction coefficient "Vr/Vd" is less than 1, it is possible to rapidly correct the loss of the torque.

That is, using the rotational conditions of the front and rear axle assemblies 11a and 11b, which cause the yaw moment, permits the loss of the torque to be rapidly precisely corrected. The engine power, therefore, can be continuously transferred with high transmission efficiency.

Second Embodiment

In the above mentioned first embodiment, the manager ECU 4 carries out the decreasing of the engine power (engine torque) to overcome the unstable conditions of the vehicle V.

In contrast, the manager ECU 4 of the driving condition control system according to the second embodiment adjusts the torque based on another processes.

That is, generating the brake force allows the torque to be adjusted except for the decrease of the engine power. In this second embodiment, the manager ECU 4 carries out the adjustment of the torque based on the braking forces.

Processes executed by the manager ECU 4 according to the second embodiment are partially different from those executed by the manager ECU 4 according to the first embodiment so that these partially different processes of the management ECU 4 according to the second embodiment will be explained hereinafter. The remaining processes and the structure of the driving condition control system according to the second embodiment are substantially identical with those of the driving condition control system according to the first embodiment, so that explanations thereabout are omitted.

Figure 5:
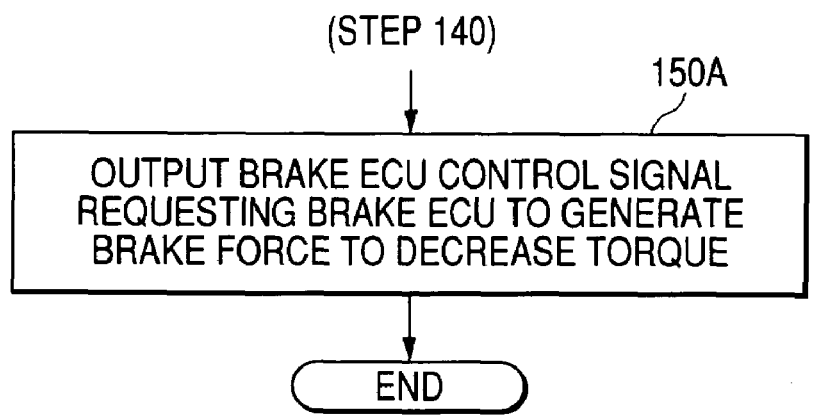
FIG. 5 is a flowchart schematically illustrating a process that the manager ECU executes according to a second embodiment of the present invention.

As shown in FIG. 5, in place of the process in step 150 of FIG. 2, the manager ECU 4 makes the brake ECU 9 perform the brake force generation process through each of the brake force generating units 10a-10d without adjusting the command torque included in the engine control signal.

That is, the management ECU 4, for decreasing the torque, outputs to the brake ECU 9 the control signal requesting the brake ECU 9 to generate the brake force (step 150A). The brake ECU 9 produces the brake control signal in response to the reception of the control signal outputted form the manager ECU 4, thereby outputting the brake control signal to each of the brake force generating units 10a-10d.

Each of the brake force generating units 10a-10d applies the brake force (mechanical force) on each of the brake shoes, thereby braking each of the wheels FR, FL, RR, and RL.

The brake forces applied on the front and rear wheels FR, FL, RR, and RL may be approximately constant, or may be differently distributed between the front wheels FR, FL and the rear wheels RR, RL. The brake forces applied on the front and rear wheels FR, FL, RR, and RL may also be differently distributed between the inside wheels and the outside wheels during turning.

This structure allows the torque transferred to the drive axle assembly 11b to decrease, making it possible to correct the loss of the torque, thereby obtaining the same effects as the first embodiment.

Other Embodiments

In the first and second embodiments, the adjustment of the torque is performed according to the ratio of the rotational conditions of the drive axle assembly and the rolling axle assembly. In the present invention, the adjustment of the torque may be performed according to the difference between the rotational conditions of the drive axle assembly and the rolling axle assembly.

In this case, the difference between the rotational conditions of the drive axle assembly and the rolling axle assembly corresponds to the loss of the torque. This correspondence makes it possible to adjust the torque by subtracting a correction amount of torque based on the difference between the rotational conditions of the drive axle assembly and the rolling axle assembly from the command torque.

In the driving condition control system shown in each of the first and second embodiments, the adjustment of the torque is performed by adjusting the engine power or the brake force. In the present invention, it may be possible to use the adjustment of the engine power and that of the brake force in combination, thereby adjusting the torque transferred to the drive axle assembly 11b.

Figure 6:
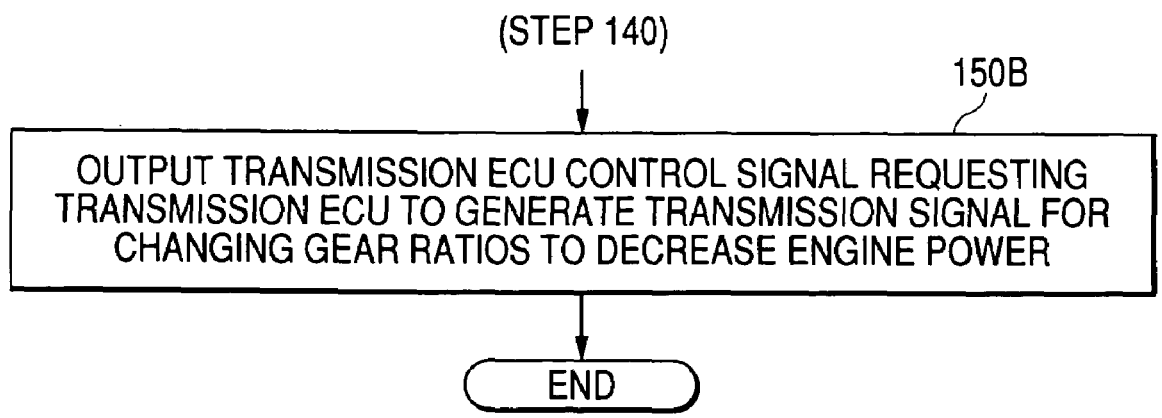
FIG. 6 is a flowchart schematically illustrating a process that the manager ECU executes according to a modification of the present invention.
Figure 7:
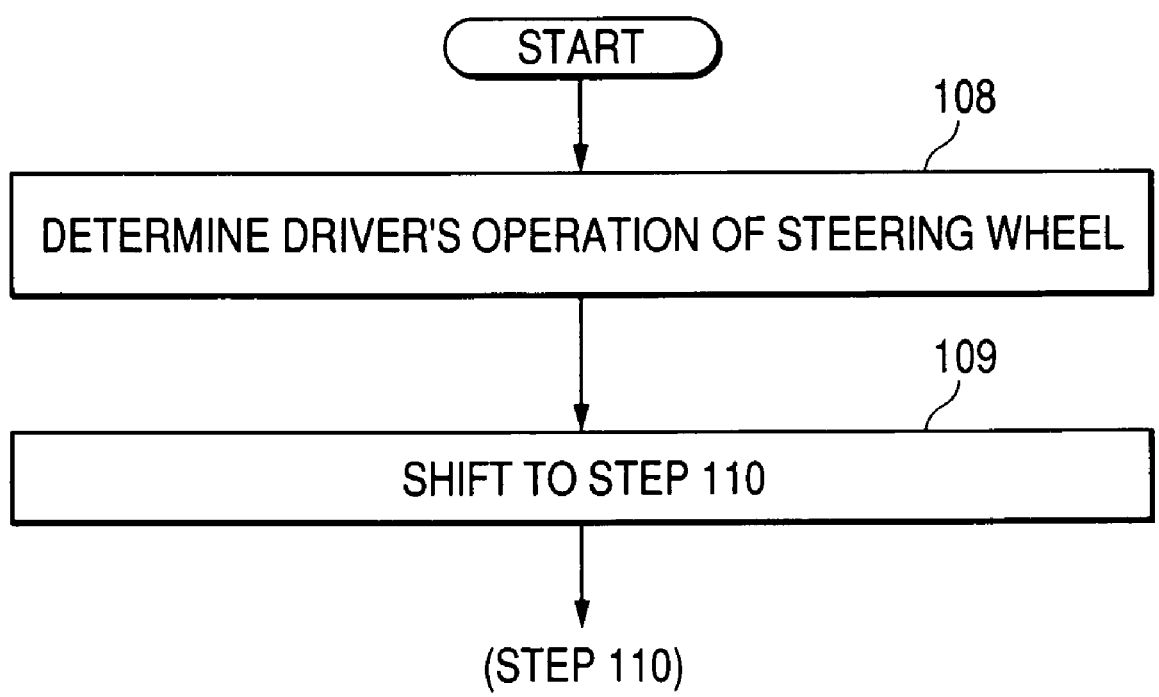
FIG. 7 is a flowchart schematically illustrating a process that the manager ECU executes according to another modification of the present invention.

In addition, the management ECU 4, for decreasing the torque, may output to the transmission ECU 8 the control signal requesting the transmission ECU 8 to generate the transmission signal for changing the gear ratios to decrease the engine power corresponding to the driver's intention (FIG. 6; step 150B). This control of the gear ratios allows the torque transferred to the drive axle assembly 11b to be adjusted.

Moreover, the driving condition control system according to each of the first and second embodiments and modifications thereof can correct the loss of the torque at any time during the running of the vehicle V.

In the present invention, when determining the driver's operation of the steering wheel 12 (FIG. 7 step 108), the manager ECU 4 shifts to step 10 (step 109) to perform these processes in steps 110-150 according to the flowcharts shown in FIGS. 2, 5-7. That is, in this modification, it is possible to perform the torque loss correcting processes only when the vehicle V is turning.

Incidentally, these steps (processes) shown in FIGS. 2, 5-7 are performed by the manager ECU 4, but they may be performed by at least two of the ECUs in combination, or other one of the ECUs. These steps (processes) shown in FIGS. 2, 5-7 in combination or alone correspond to processing units of the present invention. The driving condition control system according to the present invention may provide a plurality of hard-wired logic circuits that perform these processes in place of the manager ECU 4.

Furthermore, each of the driving condition control systems according to the first and second embodiments and modifications thereof may be installed in another vehicle, such as two-wheel automobile.

While there has been described what is at present considered to be the embodiments and modifications of the invention, it will be understood that various modifications which are not described yet may be made therein, and it is intended to cover in the appended claims all such modifications as fall within the true spirit and scope of the invention.

This application is based upon and claims the benefit of priority of the prior Japanese Patent Application 2003-173853 filed on Jun. 18, 2003 so that the contents of which are incorporated herein by reference.

What is claimed is:

1. A driving condition control system installed in a vehicle, wherein said vehicle has a source of power for generating power, a first rotatable axle assembly to which a first wheel is attached, and a second rotatable axle assembly to which a second wheel is attached, said power being transferred to the second rotatable axle assembly so that the second rotatable axle assembly is rotated to generate torque, said driving condition control system comprising:

a sensing unit configured to sense a first physical quantity indicative of a rotation of the first rotatable axle assembly and a second physical quantity indicative of a rotation of the second rotatable axle assembly; and a correcting unit configured to correct the torque according to a ratio between the sensed first and second physical quantities of the rotations of the first and second rotational axle assemblies, wherein said correcting unit is configured to sequentially correct a value of the torque using the following equation:

$$Td\text{-new} = \min\{(Vr/Vd), 1\} \cdot Td\text{-now},$$

where Vr represents the sensed first physical quantity, Vd represents the sensed second physical quantity, Td-new represents a value of the corrected torque, Td-now represents a previous value of the torque previously corrected by the correcting unit, and $\min\{(Vr/Vd), 1\}$ represents a function of outputting the lesser of the (Vr/Vd) and 1.

2. A driving condition control system according to claim 1, wherein, when the sensed first physical quantity is less than the sensed second physical quantity, the correcting unit is configured to determine that the vehicle is driving in an unstable condition of inside turning, and to correct the torque in accordance with the ratio of the sensed first physical quantity to the sensed second physical quantity.

3. A driving condition control system according to claim 1, further comprising a turning determining unit configured to determine whether the vehicle is turning, wherein said sensing unit starts to sense the first physical quantity of the rotation of the first rotatable axle assembly and the second physical quantity indicative of the rotation of the second rotatable axle assembly in response to the determination of the turning determining unit in that the vehicle is turning.

4. A driving condition control system according to claim 1, wherein said sensing unit is configured to sense a first rotational speed of the first rotational axle assembly and a second rotational speed of the second rotational axle assembly as the first and second physical quantities.

5. A driving condition control system according to claim 1, wherein said correcting unit is configured to correct the power generated by the source of power to correct the torque.

6. A driving condition control system according to claim 1, wherein said vehicle has an acceleration pedal, said source of power is an engine for generating the power according to a command value inputted by a driver's operation of the acceleration pedal, and said correcting unit is configured to correct the command value to correct the torque.

7. A driving condition control system according to claim 1, further comprising:

a plurality of brake force generating units mechanically connected to the first and second wheels of the vehicle and configured to generate brake forces to apply the brake forces to the first and second wheels, respectively; and a brake force control unit operatively connected to the plurality of brake force generating units and configured to control the generated brake forces, wherein said correcting unit is configured to cause the brake force control unit to control the plurality of brake force generating units to generate the brake forces, said braking forces correcting the torque.

8. A driving condition control system according to claim 1, wherein said vehicle is equipped with an automatic transmission that has a gear box and mechanically connected between the source of power and the second rotatable axle assembly, said automatic transmission changing gear ratios of the gear box to convert the power generated by the source to torque based on the gear ratios, thereby transferring the torque to the second axle assembly, wherein said correcting unit is electrically connected to the automatic transmission and configured to control the automatic transmission to change the gear ratios, thereby adjusting the torque.

9. A program product having a computer-readable medium storing therein a program readable by an electronic control unit, said electronic control unit being installed in a vehicle, wherein said vehicle has a source of power for generating power, a first rotatable axle assembly to which a first wheel is attached, a second rotatable axle assembly to which a second wheel is attached, said power being transferred to the second rotatable axle assembly so that the second rotatable axle assembly is rotated to generate torque, and a sensing unit that senses a first physical quantity indicative of a rotation of the first rotatable axle assembly and a second physical quantity indicative of a rotation of the second rotatable axle assembly, said program causing an electronic control unit to:

receive the first physical quantity indicative of the rotation of the first rotatable axle assembly and the second physical quantity indicative of the rotation of the second rotatable axle assembly from the sensing unit; and correct the torque according to a ratio between the sensed first and second physical quantities of the rotations of the first and second rotational axle assemblies.

wherein said correcting of the torque includes sequentially correcting a value of the torque using the following equation:

$$Td\text{-new} = \min\{(Vr/Vd), 1\} \cdot Td\text{-now},$$

where Vr represents the sensed first physical quantity, Vd represents the sensed second physical quantity, Td-new represents a value of the corrected torque, Td-now represents a previous value of the torque previously corrected by the correcting unit, and min{(Vr/Vd), 1} represents a function of outputting the lesser of the (Vr/Vd) and 1.

10. A method of controlling a driving condition of a vehicle, wherein said vehicle has a source of power for generating power, a first rotatable axle assembly to which a first wheel is attached, and a second rotatable axle assembly to which a second wheel is attached, said power being transferred to the second rotatable axle assembly so that the second rotatable axle assembly is rotated to generate torque, said method comprising:

sensing a first physical quantity indicative of a rotation of the first rotatable axle assembly and a second physical quantity indicative of a rotation of the second rotatable axle assembly; and correcting the torque according to a ratio between the sensed first and second physical quantities of the rotations of the first and second rotational axle assemblies, wherein said correcting includes sequentially correcting a value of the torque using the following equation:

$Td\text{-new} = \min\{(Vr/Vd), 1\} \cdot Td\text{-now},$ where Vr represents the sensed first physical quantity, Vd represents the sensed second physical quantity, Td-new represents a value of the corrected torque, Td-now represents a previous value of the torque previously corrected by the correcting unit, and min{(Vr/Vd), 1} represents a function of outputting the lesser of the (Vr/Vd) and 1.

11. A method of controlling driving condition of a vehicle according to claim 10, wherein, when the sensed first physical quantity is less than the sensed second physical quantity, the correcting includes:

determining that the vehicle is driving in an unstable condition of inside turning, and correcting the torque in accordance with the ratio of the sensed first physical quantity to the sensed second physical quantity.

12. A method of controlling a driving condition of a vehicle according to claim 10, further comprising:

generating brake forces to apply the brake forces to the first and second wheels, respectively; and controlling the generated brake forces, wherein said correcting step generates the plurality of brake forces acting on the first and second wheels, respectively, thereby correcting the torque.

13. A method of controlling a driving condition of a vehicle according to claim 10, wherein said vehicle has an acceleration pedal, said source of power is an engine for generating the power according to a command value inputted by a driver's operation of the acceleration pedal, and said correcting step corrects the command value to correct the torque.

14. A method of controlling a driving condition of a vehicle according to claim 10, wherein said sensing step senses a first rotational speed of the first rotational axle assembly and a second rotational speed of the second rotational axle assembly as the first and second physical quantities.

15. A method of controlling a driving condition of a vehicle according to claim 10, wherein said correcting step corrects the power generated by the source of power to correct the torque.

* * * * *